(12) United States Patent
Grunwald et al.

(10) Patent No.: US 8,978,780 B2
(45) Date of Patent: *Mar. 17, 2015

(54) HANDHELD POWER TOOL HAVING A SHIFTABLE MECHANISM

(71) Applicant: Robert Bosch GmbH, Stuttgart (DE)

(72) Inventors: Michael-Andreas Grunwald, Stuttgart-Rohr (DE); Marco Pawlowski, Laatzen (DE); Joerg Welke, Ettlingen-Schoellbronn (DE); Dietmar Saur, Gomaringen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/135,878

(22) Filed: Dec. 20, 2013

(65) Prior Publication Data

US 2014/0174776 A1  Jun. 26, 2014

Related U.S. Application Data

(63) Continuation of application No. 12/896,313, filed on Oct. 1, 2010, now Pat. No. 8,636,080.

(30) Foreign Application Priority Data

Oct. 2, 2009  (DE) .......................... 10 2009 045 316
Jun. 21, 2010  (DE) .......................... 10 2010 030 307

(51) Int. Cl.
*B25F 5/00* (2006.01)
*B25B 21/00* (2006.01)
*B23B 45/00* (2006.01)

(52) U.S. Cl.
CPC ............... *B25F 5/001* (2013.01); *B23B 45/008* (2013.01); *B25B 21/00* (2013.01); *B23B 2260/136* (2013.01)
USPC ............. 173/47; 173/170; 173/171; 173/176; 173/216; 173/217

(58) Field of Classification Search
CPC ........... B25F 5/00; B25F 5/001; B25B 21/00; B25B 21/008
USPC .................... 173/47, 170, 171, 176, 216, 217
See application file for complete search history.

(56) References Cited

U.S. PATENT DOCUMENTS

| 4,726,430 A | 2/1988 | Hendrikx et al. |
| 4,791,833 A | 12/1988 | Sakai et al. |
| 5,366,025 A | 11/1994 | Dutschk et al. |
| 5,711,739 A | 1/1998 | Hashimoto et al. |
| 7,513,845 B2 | 4/2009 | Ho |

FOREIGN PATENT DOCUMENTS

| CN | 101117999 | 2/2008 |
| DE | 35 25 208 | 1/1986 |
| DE | 4121279 | 1/1993 |
| DE | 19531043 | 2/1996 |
| DE | 197 54 165 | 6/1999 |
| DE | 10 2008 042 033 | 3/2010 |
| EP | 2206572 | 7/2010 |
| JP | 5-73343 | 10/1993 |
| WO | WO 2010/028924 | 3/2010 |

*Primary Examiner* — Michelle Lopez
(74) *Attorney, Agent, or Firm* — Kenyon & Kenyon LLP

(57) ABSTRACT

A handheld power tool with a shiftable mechanism, which is adjustable between two operating positions, has a coupling spring that is coupled with an adjustable shifting member of the mechanism. The coupling spring is embodied as a metastable spring.

28 Claims, 5 Drawing Sheets

HANDHELD POWER TOOL HAVING A SHIFTABLE MECHANISM

The present application is a continuation application of U.S. patent application Ser. No. 12/896,313, filed on Oct. 1, 2010, and claims priority to German Patent Application No. 10 2009 045 316.4, filed on Oct. 2, 2009, and German Patent Application No. 10 2010 030 307.0, filed on Jun. 21, 2010, all of which are hereby incorporated by reference in their entireties.

BACKGROUND OF THE INVENTION

1. Field of the Invention

The invention relates to a handheld power tool having a shiftable mechanism.

2. Description of the Prior Art

In German Patent Disclosure DE 10 2004 058 809 A1, a cordless screwdriver is described, which has a multi-stage planetary gear by way of which the driving motion of an electric drive motor is converted into a desired rotary speed at a defined torque of a tool receptacle for receiving a tool.

Typically, the gear in such handheld power tools is embodied shiftably and shifting can be done between a first gear stage with a slow speed of revolution and high torque, and a second gear stage with a greater speed of revolution and a lower torque. The switching event is executed with the aid of a user control element, which is to be adjusted between various switching positions. The user control element actuates a control gear of the planetary gear and adjusts it between various operating positions. In the transmission path between the user control element and the control gear, there is a torsion spring, counter to whose spring force the manual adjusting motion has to be performed.

OBJECT AND SUMMARY OF THE INVENTION

It is the object of the invention to embody a handheld power tool, which has a mechanism that can be shifted between at least two operating positions, with simple structural provisions in such a way that the change between the operating positions is done securely and in an ergonomically favorable way.

The handheld power tool of the invention has, in a housing, a drive motor, preferably an electric drive motor, whose driving motion is transmissible via a shiftable mechanism to a tool which is received replaceably in a tool receptacle. In the case of an electric drive motor as the driving device, the motor is either supplied via a power cord or, in a preferred version, via a portable and rechargeable battery on the housing of the handheld power tool; in that case, the handheld power tool is a cordless screwdriver or cordless drill, for instance.

The shiftable mechanism in the handheld power tool is to be adjusted between at least two operating positions, each of which is associated with a certain property, so that on a change between operating positions, a parameter of the transmission in the drive train between the driving device and the tool receptacle changes. In a preferred embodiment, each operating position is assigned a defined rpm ratio and torque transmission. In this way, by way of a change between the operating positions, a switchover can be made between a lesser rpm with higher torque and a higher rpm with lesser torque.

The adjustment of the mechanism between the at least two operating positions is expediently done with the aid of a user control element, which is adjustable between switching positions that are associated with the operating positions of the mechanism. In the transmission path between the user control element and mechanical component of the shiftable mechanism, there is a coupling spring, which according to the invention is embodied as a metastable spring, which in a first operating position or switching position of the user control element assumes a stable position, and in a second operating position or switching position of the user control element assumes a quasi-stable position. In the quasi-stable position, the coupling spring exerts a lesser force than in an intermediate position between the two switching positions.

Various advantages are attained with this embodiment. The coupling spring is given a dual function, in that on the one hand the coupling spring transmits the switching motion of the user control element to the mechanical component of the shiftable mechanism and on the other keeps the use control element in a stable position in one switching position and in a quasi-stable position in the second switching position. In the stable switching position, the user control element remains in its position as long as no external forces, oriented counter to the spring force of the coupling spring and strong enough to move the user control element out of the stable switching position, are exerted on the user control element. In the quasi-stable position, the coupling spring likewise exerts a spring force on the user control element; however, this spring force is less than in the transmission path between the two switching positions. This means that the quasi-stable switching position is perceptible as a switching point; when it is reached, the spring force becomes less, and this can be felt by the user. The force that must be expended by the user in order to maintain the quasi-stable switching position is reduced, compared to the maximum force between the switching positions. However, since the spring force continues to be operative, the coupling spring brings about a restoration from the quasi-stable switching position back to the stable switching position as soon as the contrary force exerted by the user goes away.

This embodiment has the advantage that the user control element has to be adjusted by the user counter to the force of the coupling spring in only one direction in order to establish a transition between the switching positions and associated with that between the operating positions of the shiftable mechanism. In the opposite direction, the adjustment is effected by the force of the coupling spring, without requiring active intervention by the user. Because of the embodiment as a metastable coupling spring, however, the holding force to be exerted by the user in the quasi-stable switching position is reduced, so that it is ergonomically feasible to stay in the quasi-stable position.

Various structural embodiments of the coupling spring as a metastable spring element can be considered. In one preferred version, it is provided that the coupling spring is embodied as a spring ring, which is advantageously embodied at least approximately as a full circle. In a preferred embodiment, the spring ring forms a closed full circle, and fundamentally split circles or partly circular versions, such as semicircular spring rings, can also be considered. However, the embodiment as a closed full circle has the advantage that the coupling spring is embodied as especially stable and furthermore is subjected to a lesser extent to wear.

The spring ring can have a conical shape, which when prestressing is absent represents the stable position of the spring ring. Upon a deformation of the spring ring, the conicity is reduced by exerting a force, and when a metastable position is reached, the spring ring generates a reduced spring force, which is oriented in the direction of the outset position. Expediently, in the installed position in its outset position, the spring ring does not exert any spring force, so that the outset position, representing the stable switching position, is free of force. However, the spring force of the spring ring does counteract changes from the stable outset position, and on reaching the second, quasi-stable switching position, the spring force decreases again, so that particular switching position can be maintained by the user with less expenditure of force. With the disappearance of the contrary force of the user, the spring ring automatically resumes its first, stable outset position. However, prestressing of the spring ring in the stable position is fundamentally also possible.

This spring behavior of the spring ring can optionally be attained by means of spring arms, which in particular are embodied in one piece with the spring ring and which extend outward on the outer circumference of the spring ring with a radial and/or axial component. The spring arms are embodied angularly, for instance, and in the installed position are braced on a component of the handheld power tool. As a result, in particular even in the outset position, which represents the stable switching position, spring force exertion exists, which keeps the shiftable mechanism in the stable outset position. The spring arms can be combined with a conical shape of the spring ring, by way of which a metastable spring behavior can also be attained. However, an embodiment of the spring ring as a disk is fundamentally possible as well.

It is also expedient to provide at least one bracing element and preferably two bracing elements on the spring ring, by way of which elements the spring ring is braced on a component on the handheld power tool, particularly on the user control element. The bracing elements are embodied for instance as radially protruding, diametrically opposed bracing tabs. The above-described spring arms form bracing elements as well.

It is moreover expedient to provide radial outward-protruding connecting elements on the spring ring, which are integrally formed onto the annular body of the spring ring. The connecting elements serve to connect and mount the spring ring with one or more components of the handheld power tool.

The mechanism which is to be adjusted between the at least two operating positions via the user control element is preferably embodied as a gear with at least two gear stages, which represent the respective operating positions. The user control element forms a gear shifter, by way of which the various gear stages of the gear are to be shifted into. The gear is embodied in particular as a planetary gear, preferably as a multi-stage planetary gear, and the gear can have at least two gear stages between which the gear can be shifted. Each gear stage of the gear represents one operating position. In this case, the user control element is embodied as a gear shifter, by way of which the gear stages of the gear are to be shifted into. An adjustable shifting member can also be provided, which is acted on by the coupling spring and is embodied for instance as a hollow control gear, which in one switching position of the gear shifter is coupled with a sun wheel of the planetary gear.

The coupling spring is preferably embodied as a metal part, in particular as a sheet-metal part. Fundamentally, however, versions of other materials, in particular plastic, can also be considered.

In an advantageous version, the metastable coupling spring is embodied as a one-piece component, which is embodied for instance as a metal part. In a further expedient version, conversely, it is provided that the coupling spring is embodied in multiple parts and includes at least two cooperating individual springs, which are embodied as metal springs or comprise some other material, such as plastic. With regard to their spring properties, the individual springs are embodied such that in cooperation of the individual springs, the metastable spring behavior is achieved. Compared to the one-piece version, this has the advantage that the individual springs themselves need not necessarily have a metastable spring behavior; instead, the metastable behavior comes about only from the cooperation of the individual springs. Accordingly, the individual springs can be constructed comparatively simply and produced simply.

The cooperation of the individual springs is achieved in particular by providing that the individual springs are in contact with one another, and the individual springs are preferably connected in parallel. However, a series connection of the individual springs can fundamentally be considered as well. In an advantageous version, it is provided that at least two individual springs, and in particular all the individual springs of the coupling spring, are each braced by one portion on the housing and advantageously touch one another or are braced on one another with a further portion. For instance, the case of a coupling spring composed of two individual springs, a first individual spring can contact the shiftable component of the mechanism and exert force on it, while conversely the second individual spring, which like the first individual spring is braced on the housing, exerts force directly on the first individual spring without directly contacting the switchable component. As a result, there is a parallel connection of the individual springs with an overall spring characteristic that differs from the spring characteristics of the individual springs.

In a further advantageous version, one of the individual springs is embodied as a bistable spring element, and a further individual spring is embodied as a spring element with linear spring behavior. In the series connection, the desired metastable spring characteristic is obtained. Structurally, this can be embodied in such a way that the first individual spring, which has the bistable spring behavior, is embodied as a spring ring, and the second individual spring with the linear spring behavior is embodied as a spring lever.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
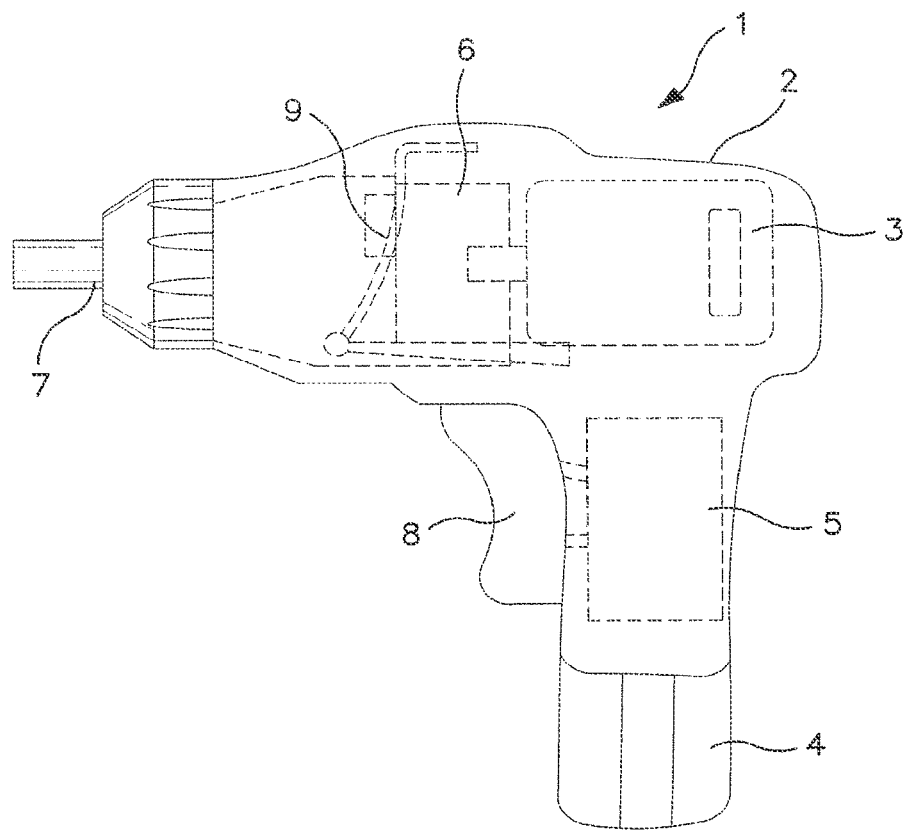
FIG. 1 shows an electrical handheld power tool, embodied as a cordless screwdriver, which in a housing has a planetary gear that is adjustable between two gear stages, the shifting event being effected by actuation of a switch that is connected via a coupling spring to a shifting member of the gear.

In the drawings, identical components are provided with the same reference numerals.

The handheld power tool 1 shown in FIG. 1 is a cordless screwdriver, which in a housing 2 has an electric drive motor 3, which is supplied with current via a replaceable battery disposed on the handle 5 of the handheld power tool. The drive motor 3 is coupled with a planetary gear 6, which drives a power takeoff spindle 7 that is intended for receiving a tool receptacle for a tool. The planetary gear 6 is embodied with multiple stages and shiftably between at least two operating positions, which can be shifted into with the aid of a switch button 8 on the handle 5. The switch button 8 actuates a switch in the handle 5 for switching the electric drive motor on and off. Moreover, the switch button 8 has the task of switching back and forth between the various operating positions of the gear. This is done via the extent to which the switch button 8 is pressed into the handle 5 of the housing. The switch button 8 thus forms a user control element for shifting the gear 6 between the various operating positions. The switch button 8 assumes various switching positions, which correspond to the operating positions of the gear.

For transmitting the switching motion of the switch button 8 to the gear 6, a coupling spring 9 is used, which is connected to a shifting member, embodied as a hollow control gear, of the planetary gear. The coupling spring 9 is embodied as a metastable spring element, which is adjustable between a stable position, which corresponds to the first switching position of the switch button 8 and thus to the first operating position of the planetary gear, and a quasi-stable position, which corresponds to the second switching position of the switch button 8 and thus to the second operating position of the planetary gear. The stable first switching position is expediently the outset position of the switch button 8. The quasi-stable, second switching position is preferably the pressed-in position of the switch button 8. In the stable outset position, the force of the coupling spring 9 is oriented counter to the change in position of the switch button 8, so that for shifting the gear from the first to the second operating position, the switch button 8 has to be adjusted counter to the force of the coupling spring 9. In the quasi-stable position, which corresponds to the second switching position or operating position, the force of the coupling spring is reduced, but is not equal to zero, and is oriented in the direction of the outset position; this has the advantage that the switch button 8 has to be held by the user with only a reduced expenditure of force. For attaining the quasi-stable, pressed-in switching position, however, a force maximum that is generated by the coupling spring must be overcome by the user.

Figure 2:
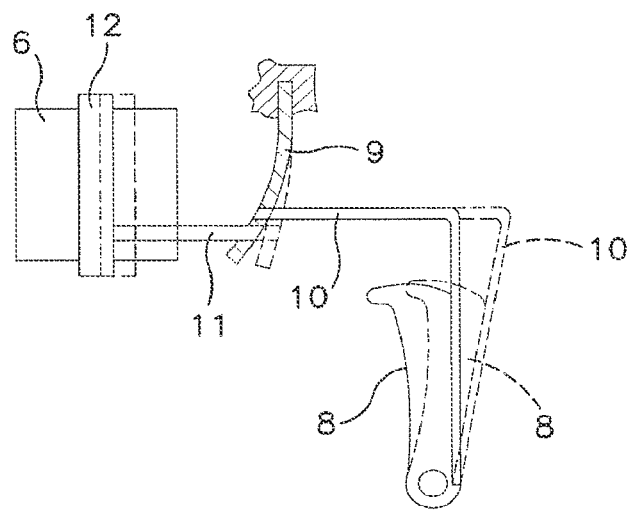
FIG. 2 individually shows a gear shifter, which actuates a metastable coupling spring that is coupled with a control gear of the gear.

In FIG. 2, the components involved in the gear shifting are shown in an individual view. The switch button 8 is held rotationally pivotably but can optionally also, as indicated by dashed lines in FIG. 1, be disposed translationally displaceably on the housing; for shifting among the various switching positions, a corresponding rotational or translational adjusting motion has to be executed.

The switch button 8 is connected via a first connecting element 10 to the coupling spring 9, which is coupled via a second connecting element 11 to a shift element 12, embodied as a hollow control gear, of the gear 6. The outset position is represented by a solid line; this outset position corresponds to the stable position of the coupling spring 9. The adjusted position of the switch button 8 and of the first connecting element 10 is represented by a dashed line; this adjusted position, which corresponds to a control path, characterizes the quasi-stable second position of, the coupling spring 9. In the outset position, the planetary gear 6 is in the first operating position, while in the adjusted position it is in the second operating position.

In a variant embodiment, the switch button 8 is connected directly to the coupling spring 9, so that the first connecting element 10 can be dispensed with. In a further variant embodiment, the switch button 8 is connected directly to the second connecting element 11, which in turn is coupled to the coupling spring 9; in this version as well, the first connecting element 10 can be dispensed with.

Figure 3:
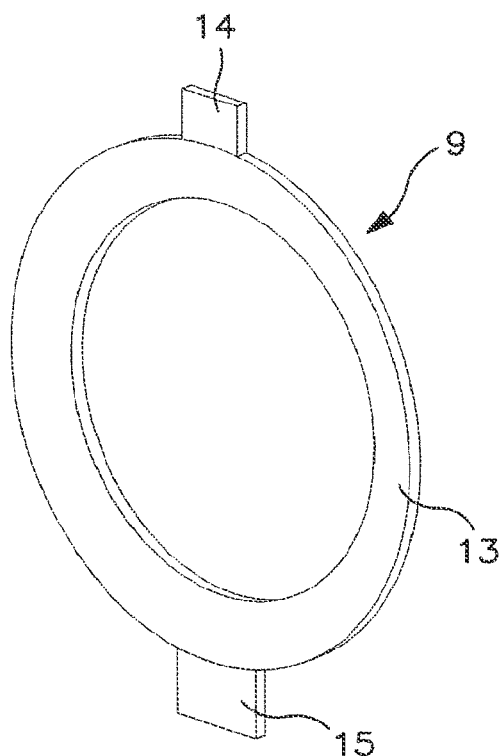
FIG. 3 shows a coupling spring embodied as a closed spring ring.

In FIG. 3, a coupling spring 9 in the form of a spring ring is shown. The coupling spring 9 comprises a closed ring 13, which is curved in conical form, as well as radially outward-protruding, diametrically opposed bracing tabs 14 and 15 for attachment to the housing or to a gearbox of the handheld power tool. The coupling spring 9 embodied in this form represents a metastable spring element, which is to be adjusted between a stable outset position and a quasi-stable second position.

Figure 4:
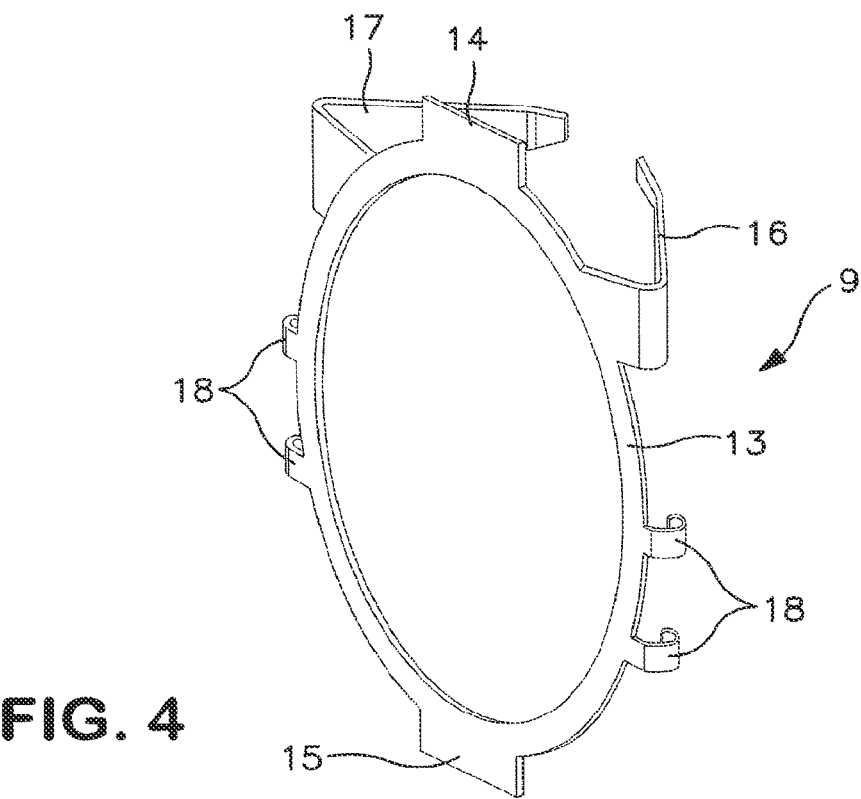
FIG. 4 shows an annular coupling spring in a further version.

In the exemplary embodiment of FIG. 4 as well, a metastable coupling spring 9 is shown, comprising a closed ring 13, but in a distinction from the first exemplary embodiment it is embodied in disklike form. Spring arms 16 and 17 embodied in one piece are integrally formed onto the outer circumference of the ring 13 and are each embodied angularly and are braced in the installed position on a component of the handheld power tool. Upon an adjustment of the coupling spring in the manner shown in FIG. 2, the spring arms 16, 17 and the ring 13 generate a spring force, which exceeds a maximum at the transition between the stable outset position and the quasi-stable position.

As in the exemplary embodiment of FIG. 3, radially outward-protruding, diametrically opposed bracing tabs 14 and 15 are also integrally formed onto the coupling spring 9 in FIG. 4. The two spring arms 16 and 17 are both located in the same, upper half of the ring 13 and are spaced apart from the upper bracing tab 14 by an angular spacing of approximately 30°.

Moreover, connecting elements 18, which serve to connect the coupling spring 9 to further components of the handheld power tool, are integrally formed onto the ring 13 of the coupling spring 9 on the outer circumference. For example, via the upper connecting elements 18, an attachment to the user control element, referred to previously as switch button 8, or to the connecting element 10 (FIG. 2) can be created, and via the lower connecting elements 18, the connection into the gear can be created.

Figure 5:
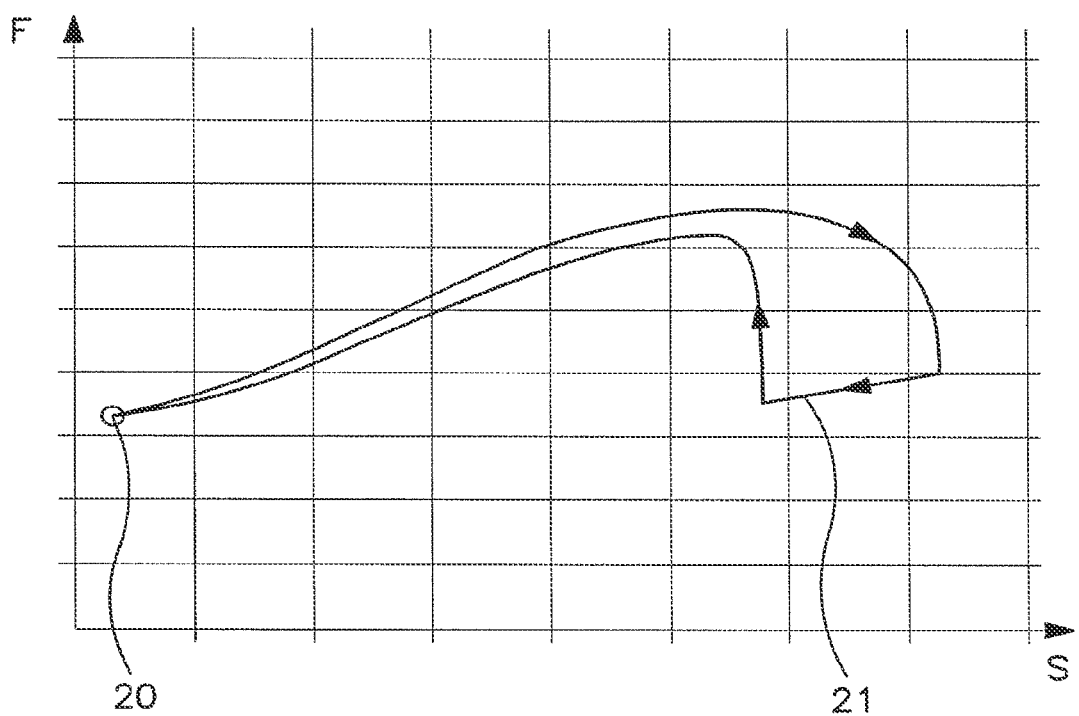
FIG. 5 shows a characteristic curve of a metastable coupling spring.

In FIG. 5, a force/travel spring characteristic curve of a metastable coupling spring is shown. The outset point on the left corresponds to the stable outset position 20 of the coupling spring; the region plotted on the right corresponds to the quasi-stable position 21. In the transition between the positions 20 and 21, a force maximum has to be overcome. In the quasi-stable position 21, the spring characteristic curve has a force level that is markedly reduced compared to the force maximum but is still higher than in the stable outset position 20. As soon as the contrary force exerted by the user goes away, the spring characteristic curve returns, as indicated by the arrows, back from the quasi-stable position 21 to the stable position 20.

Figure 6:
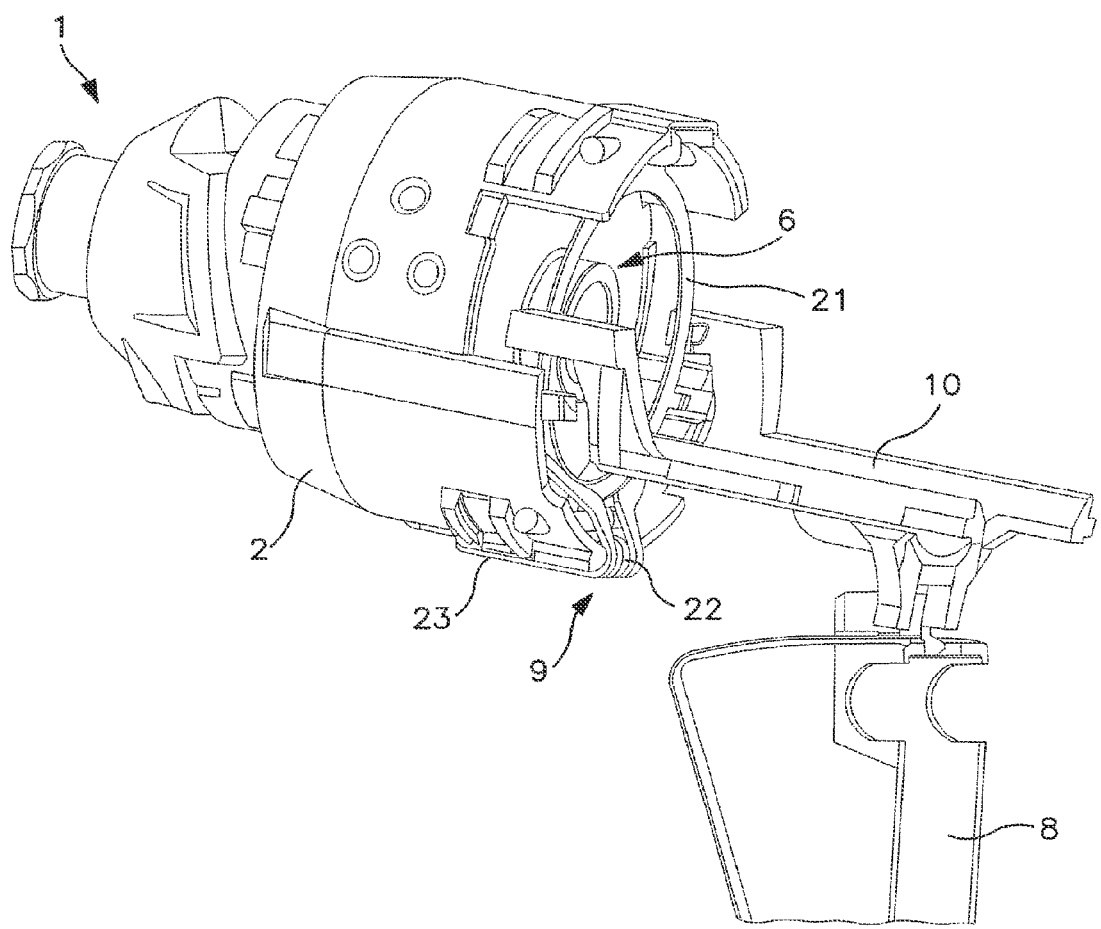
FIG. 6 shows an electrical handheld power tool with a coupling spring composed of two individual springs.
Figure 7:
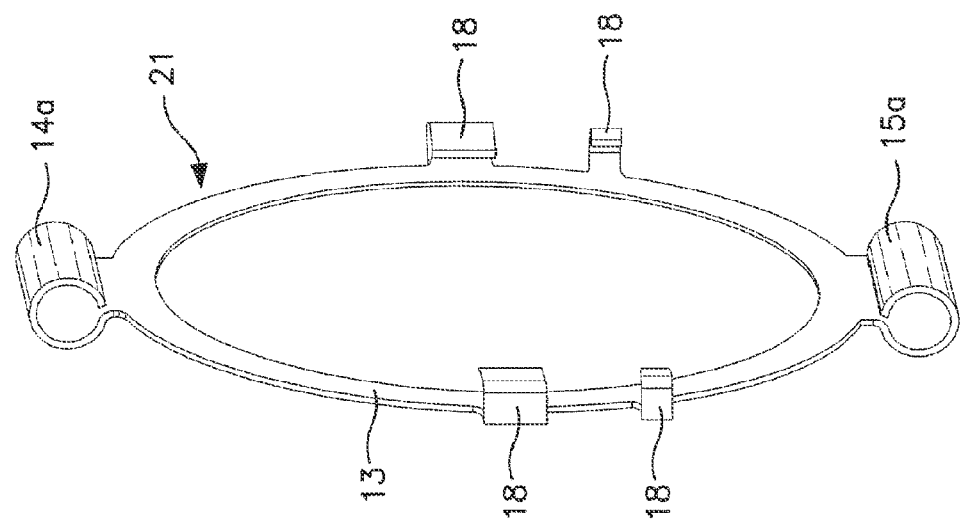
FIG. 7 shows the coupling spring comprising the two individual springs.
Figure 7:
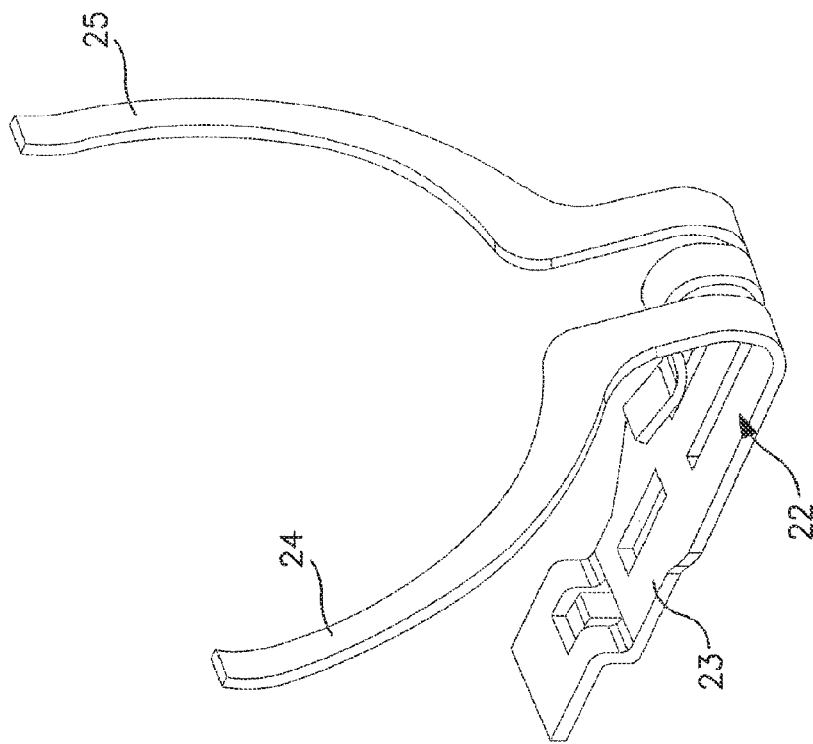

In FIGS. 6 and 7, a further exemplary embodiment is shown. The handheld power Tool 1 is once again a cordless screwdriver, with a housing 2 embodied as a gearbox, in which a gear to be driven by an electric drive motor is received, for transmitting the driving motion of the motor to the power takeoff spindle. The gear 6 is embodied for example as a multi-stage planetary gear, which is shiftable between various operating positions. Shifting between the operating positions is done manually with the aid of a switch button 8, and the shifting motion of the switch button 8 is transmitted via a connecting element 10 to the coupling spring 9, which has a metastable spring characteristic and is adjustable between a stable position, which corresponds to a first operating position of the gear, and a quasi-stable position, which corresponds to a second operating position of the gear. To this extent, the exemplary embodiment of FIGS. 6 and 7 is equivalent to the first exemplary embodiment described above.

While in the first exemplary embodiment the coupling spring 9 is embodied in one piece, the coupling spring 9 in the second exemplary embodiment shown FIGS. 6 and 7 includes two individual springs 21 and 22 which cooperate and jointly form the coupling spring 9 having the metastable spring characteristic.

The first individual spring 21 is embodied as a spring ring and includes a closed ring 13 (FIG. 7), on which connecting elements 18, as well as support and retention elements 14a and 15a, which are angularly offset between connecting elements 18 and by way of which an attachment to the housing 2 and a connection with the connecting element 10 and the shifting member of the gear are made. The annular individual spring 21 has a bistable spring behavior.

Moreover, the second individual spring 22 is also a component of the coupling spring; the second individual spring 22 is embodied as a spring lever or spring hoop and includes a support plate 23, by way of which the individual spring 22 is connected to the housing 2, and also includes two spring hoops 24 and 25, protruding at an angle from the support plate 23 and embodied in one piece with the support plate, which in the installed state shown in FIG. 6 rest on the first individual spring 21 and in particular are coupled to the connecting elements 18 in the lateral region of the individual spring 21. The two spring hoops 24 and 25 are embodied in curved form and together describe approximately a semicircle.

The two individual springs 21 and 22 are connected functionally parallel, resulting in a total spring characteristic that differs from the characteristics of the individual springs. The total characteristic corresponds to a metastable spring behavior, while conversely the annular first individual spring 21 is embodied as a bistable spring element, and the second individual spring 22 embodied as a spring hoop has a linear spring behavior.

In the installed position, the spring hoops 24 and 25 of the second individual spring 22 rest on the ring 13 of the first individual spring 21, which is acted upon by the connecting or transmission element 10 on the one hand and on the other is braced on the shifting member of the gear.

The foregoing relates to preferred exemplary embodiments of the invention, it being understood that other variants and embodiments thereof are possible within the spirit and scope of the invention, the latter being defined by the appended claims.

The invention claimed is:

1. A handheld power tool, comprising:
a gear comprising at least two gear stages and a shiftable mechanism which is adjustable by a user control element between a first of the gear stages and a second of the gear stages of the hand-held power tool; and
a coupling spring which acts on at least one mechanical component of the shiftable mechanism and is embodied as a metastable coupling spring which in a first operating position assumes a stable position and in a second operating position assumes a quasi-stable position, wherein in the quasi-stable position the coupling spring exerts a lesser spring force than in an intermediate position between the two operating positions.

2. The handheld power tool as defined by claim 1, wherein the at least one mechanical component of the shiftable mechanism is embodied as an adjustable shifting member.

3. The handheld power tool as defined by claim 2, wherein the adjustable shifting member is embodied as a shiftable ring gear.

4. The handheld power tool as defined by claim 1, wherein the user control element is a switch button configured to actuate a switch for switching an electric drive motor on and off.

5. The handheld power tool as defined by claim 4, wherein the switch button is connected to the coupling spring via a first connecting element.

6. The handheld power tool as defined by claim 5, wherein the coupling spring is connected to the at least one mechanical component via a second connecting element.

7. The handheld power tool as defined by claim 4, wherein the switch button is connected directly to the coupling spring.

8. The handheld power tool as defined by claim 4, wherein the switch button is connected directly to a second connecting element, which is coupled to the coupling spring.

9. The handheld power tool as defined by claim 1, wherein the coupling spring is embodied as a spring ring.

10. The handheld power tool as defined by claim 9, wherein the spring ring is embodied at least approximately as a full circle.

11. The handheld power tool as defined by claim 9, wherein the spring ring has a conical shape.

12. The handheld power tool as defined by claim 9, wherein radially outward-protruding connecting elements are integrally formed onto the spring ring.

13. The hand-held power tool as defined by claim 9, wherein the spring ring has a disk-like shape.

14. The handheld power tool as defined by claim 1, wherein the spring ring has at least one protruding bracing element, which is in contact with a component of the handheld power tool, in particular with a housing.

15. The handheld power tool as defined by claim 14, wherein the bracing element is embodied as a bracing tab.

16. The handheld power tool as defined by claim 14, wherein the bracing element is embodied as a spring arm.

17. The handheld power tool as defined by claim 16, wherein the spring arm is embodied in angular fashion.

18. The handheld power tool as defined by claim 1, wherein the gear is embodied as a planetary gear.

19. The handheld power tool as defined by claim 1, wherein the coupling spring is embodied as a metal part, in particular as a sheet-metal part.

20. The handheld power tool as defined by claim 1, wherein the coupling spring is embodied as a one-piece component.

21. The handheld power tool as defined by claim 1, wherein the coupling spring is embodied in more than one pmi and includes at least two cooperating individual springs.

22. The handheld power tool as defined by claim 21, wherein one individual spring is embodied as a bistable spring element.

23. The hand-held power tool as defined by claim 22, wherein the bistable spring element is embodied as a spring ring.

24. The hand-held power tool as defined by claim 22, wherein the bistable spring element includes radially outward-protruding connecting elements and support and retention elements, said connecting elements and support and retention elements are configured to connect the bistable spring element to a housing and to the user control element.

25. The handheld power tool as defined by claim 21, wherein one individual spring is embodied as a spring element with linear spring behavior.

26. The hand-held power tool as defined by claim 25, wherein the spring element is embodied as a spring lever which includes a support plate and two spring hoops which protrude at an angle from the support plate.

27. The handheld power tool as defined by claim 21, wherein a first individual spring is embodied as a spring ring, and a second individual spring is embodied as a spring lever.

28. The hand-held power tool as defined by claim 27, wherein the spring lever of the second individual spring includes two spring hoops which rest on the spring ring of the first individual spring.

\* \* \* \* \*